United States Patent [19]

Eckberg

[11] Patent Number: 4,547,431
[45] Date of Patent: Oct. 15, 1985

[54] ULTRAVIOLET RADIATION-CURABLE SILICONE CONTROLLED RELEASE COMPOSITIONS

[75] Inventor: Richard P. Eckberg, Roundlake, N.Y.

[73] Assignee: General Electric Company, Waterford, N.Y.

[21] Appl. No.: 505,756

[22] Filed: Jun. 20, 1983

[51] Int. Cl.$^4$ ............... C08F 2/50; B23B 27/16
[52] U.S. Cl. ............... 428/413; 204/159.13; 428/417; 428/418; 528/27
[58] Field of Search ............... 204/159.13

[56] References Cited

U.S. PATENT DOCUMENTS

| | | | |
|---|---|---|---|
| 3,527,659 | 9/1970 | Keil | 528/19 |
| 3,816,282 | 6/1974 | Viventi | 204/159.13 |
| 3,873,499 | 3/1975 | Michael et al. | 260/46.5 |
| 3,890,213 | 6/1975 | Louthan | 204/158 |
| 4,026,705 | 5/1977 | Crivello et al. | 204/159.18 |
| 4,052,529 | 10/1977 | Bokerman et al. | 428/537 |
| 4,064,027 | 12/1977 | Gant | 204/159.13 |
| 4,070,526 | 1/1978 | Colquhoun et al. | 204/159.13 |
| 4,107,390 | 8/1978 | Gordan et al. | 428/447 |
| 4,123,604 | 10/1978 | Sandford, Jr. | 528/31 |
| 4,197,173 | 4/1980 | Curry et al. | 204/159.13 |
| 4,208,471 | 6/1980 | Bresak et al. | 204/159.13 |
| 4,218,294 | 9/1980 | Brack | 204/159.15 |
| 4,279,717 | 7/1981 | Eckberg et al. | 204/159.15 |
| 4,319,974 | 3/1982 | Crivello | 528/89 |

*Primary Examiner*—John C. Bleutge
*Assistant Examiner*—A. H. Koeckert

[57] ABSTRACT

Ultraviolet radiation-curable epoxyfunctional silicone controlled release compositions are provided. Polyfunctional epoxy monomers, when added to UV-curable epoxy silicones provide quantitative variable release, depending on the amount of epoxy monomer added.

17 Claims, No Drawings

ULTRAVIOLET RADIATION-CURABLE SILICONE CONTROLLED RELEASE COMPOSITIONS

This invention relates to silicone release coating compositions. More particularly, it relates to epoxyfunctional, ultraviolet (UV) radiation-curable polysiloxane compositions containing polyfunctional epoxy monomers to control the release of abhesive surfaces formed from the cured compositions.

BACKGROUND OF THE INVENTION

Silicone compositions have become widely accepted as release coatings, which are useful to provide a surface or material which is relatively nonadherent to other materials which would normally adhere closely thereto. Silicone release compositions may be used as coatings which release pressure sensitive adhesives for labels, decorative laminates, transfer tapes, etc. Silicone release coatings on paper, polyethylene, Mylar ®, and other such substrates are also useful to provide non-stick surfaces for food handling and industrial packaging.

Previously developed silicone release products are typically sold as dispersions of reactive high molecular weight polysiloxane gums in organic solvents. A curing or cross-linking catalyst is added to the dispersed, low-solids mixture, the mixture is applied to a substrate, and the coated substrate is passed through an oven to evaporate the carrier solvent and cure the silicones to a relatively non-adherent release surface.

The large thermal energy input required to evaporate the solvents and allow proper curing (cross-linking) at commercially viable rates often makes heat-curable systems costly or burdensome to use. High energy costs and strict environmental regulation of solvent emissions make the use of solvent-borne silicone release compositions uneconomical. While solventless or emulsion-borne silicone release compositions address the environmental problems, high oven temperatures and expensive energy usage are not eliminated.

To overcome the disadvantages of heat-curable release compositions, radiation-curable silicone release compositions have been developed. Ultraviolet (UV) radiation is one of the most widely used types of radiation because of its low cost, ease of maintenance, and low potential hazard to industrial users. Typical curing times are much shorter, and heat-sensitive materials can be safely coated and cured under UV radiation whereas thermal energy might damage the substrate.

Several UV-curable silicone systems are known: U.S. Pat. Nos. 3,816,282 (Viventi); 4,052,059 (Bokerman et al); and 4,070,526 (Colquhoun et al) describe compositions wherein ω-mercaptoalkyl substituted polysiloxanes react with vinyl-functional siloxanes when exposed to UV radiation in the presence of certain photosensitizers. The compositions, however, often require scarce or expensive starting materials, have unserviceably slow cure rates, or emit offensive odors which persist in the cured products.

UV-curable silicone resins with epoxy or acrylic functionality have been found recently to have the high degree of reactivity necessary to make them suitable for release applications, while avoiding the disadvantages of other UV-curable systems. Silicone release compositions such as those described in U.S. Pat. No. 4,279,717 (Eckberg et al) and commonly assigned, copending U.S. application Ser. No. 375,676 filed May 6, 1982 are especially advantageous for their rapid curing in the presence of certain onium salt or free-radical type photocatalysts.

Cured release coatings generally exhibit exceptionally low, or "premium", release, that is, very little force is required to separate most adhesives from the silicone-treated surface. However, many commercial applications demand higher (or "tighter") release from common pressure-sensitive adhesives, and additives, called "controlled release additives" (or "CRAs") have been developed which may be added to low-release compositions to raise their release.

U.S. Pat. Nos. 4,123,664 (Sandford, Jr.) and 3,527,659 (Keil), and commonly assigned, copending U.S. application Ser. No. 416,576 filed Sept. 10, 1982, describe release-increasing CRAs based on MQ and vinyl-MQ resins for use with heat-curable silicone release systems. However, there is a need for controlled release additives which can provide different ranges of release, as required, in ultraviolet radiation-curable systems, and particularly in the aforementioned epoxy-functional polysiloxane compositions.

It has now been discovered that small amounts of polyfunctional epoxy monomers function as controlled release additives in UV-curable epoxysilicone coating compositions. Moreover, the polyfunctional epoxy monomers provide quantitative release, that is, they provide different levels of release depending on the amounts of monomers present.

All of the patents and patent applications mentioned above are hereby incorporated by reference.

SUMMARY OF THE INVENTION

Accordingly, it is an object of the present invention to provide controlled release additives (CRAs) which are compatible with UV-curable release coating compositions.

It is a further object of the present invention to provide solventless CRAs which are particularly suited to paper release applications.

It is a further object of the present invention to provide CRAs which will furnish quantitative release in UV-curable epoxy silicone release compositions.

These and other objects are accomplished herein by an ultraviolet radiation-curable controlled release composition comprising:

(A) an epoxyfunctional diorganopolysiloxane comprising units of the formula RR'SiO, where R is hydrogen or $C_{(1-8)}$ alkyl and R' is R or a monovalent epoxyfunctional organic radical of from 2 to 20 carbon atoms, said diorganopolysiloxane having up to about 20% by weight epoxyfunctional groups and a viscosity of from about 50 centipoise to 200,000 centipoise at 25° C.;

(B) a catalytic amount of a photocatalyst or a combination of photocatalysts; and (C) a small amount of polyfunctional epoxy monomer or a combination of polyfunctional epoxy monomers effective to raise the release of the cured controlled release composition.

Also contemplated herein are the preparation of the aforementioned compositions and the inclusion in the UV-curable compositions of additives to enhance certain properties of the compositions.

DETAILED DESCRIPTION OF THE INVENTION

The variable release compositions contemplated by the present invention are prepared by dispersing polyfunctional epoxy monomer controlled release additives in ultraviolet radiation-curable, epoxyfunctional silicone release coating compositions. The CRAs are added directly to a premium release composition to raise its release performance. Although the addition of small amounts of the CRAs are effective to raise the release of epoxy-functional release compositions, for convenience, proportional amounts of a photocatalyst may be included in the CRA to avoid dilution of the catalyst in the release composition to a less effective level.

The polyfunctional epoxy monomers suitable for use as CRAs in the present invention are any organic monomer having two or more epoxy groups. These include the diepoxy derivatives of such olefinic epoxy monomers as limoneneoxide, 4-vinylcyclohexeneoxide, allyl glycidyl ether, 7-epoxy-1-octene, cresylglycidyl ether, and the like. Preferred diepoxides include limonenedioxide, vinylcyclohexenedioxide, bis(2,3-epoxycyclopentyl)ether, 3,4-epoxycyclohexylmethyl-3,4-epoxycyclohexanecarboxylate, butanedioldiglycidyl ether, and the like. Limonenedioxide and vinylcyclohexenedioxide are most preferred.

The ultraviolet radiation-curable, epoxyfunctional silicone release coating compositions suitable for use in conjunction with the controlled release additives described herein are of the type disclosed in U.S. Pat. No. 4,279,717 (Eckberg et al) and U.S. application Ser. No. 375,676 filed May 6, 1982, which are incorporated herein by reference. The preferred compositions comprise epoxyfunctional polydiorganosiloxane silicone fluids which are UV-curable when combined with catalytic onium salts (described infra).

The preferred epoxyfunctional polydiorganosiloxane silicone fluids are dialkylepoxy-chainstopped polydialkylalkylepoxysiloxane copolymers wherein the polysiloxane units contain lower alkyl substituents, such as methyl groups. The epoxy functionality is obtained when certain of the hydrogen atoms on the polysiloxane chain of a polydimethyl-methylhydrogen-siloxane copolymer are reacted in a hydrosilation addition reaction with other organic molecules which contain both ethylenic unsaturation and epoxide functionality. Ethylenically unsaturated species will add to a polyhydroalkylsiloxane to form a copolymer in the presence of catalytic amounts of a precious metal catalyst. Such a reaction is the cross-linking mechanism for other silicone compositions, however, a controlled amount of such cross-linking is permitted to take place in a silicone precursor fluid or intermediate, and this is referrned to as "pre-crosslinking". Pre-crosslinking of the precursor silicone fluid means that there has been partial cross-linking or cure of the composition and offers the advantages to the present invention of enabling swift UV-initiated cure with little expense for energy and elimination of the need for a solvent.

The UV-curable expoxyfunctional silicone intermediate fluid comprises a pre-crosslinked epoxyfunctional dialkylepoxy-chainstopped polydialkyl-alkylepoxy siloxane copolymer fluid which is the reaction product of a vinyl- or allyl-functional epoxide and a vinyl-functional siloxane cross-linking fluid having a viscosity of approximately 1 to 100,000 centipoise at 25° C. with a hydrogen-functional siloxane precursor fluid having a viscosity of approximately 1 to 10,000 centipoise at 25° C. in the presence of an effective amount of precious metal catalyst for facilitating an addition cure hydrosilation reaction between the vinyl-functional cross-linking fluid, vinyl-functional epoxide, and hydrogen-functional siloxane precursor fluid.

The vinyl- or allyl-functional epoxides contemplated are any of a number of aliphatic or cycloaliphatic epoxy compounds having olefinic moieties which will readily undergo addition reaction to ≡SiH-functional groups. Commercially obtainable examples of such compounds include 1-methyl-4-isopropenyl cyclohexeneoxide (limoneneoxide; SCM Corp.), 2,6-dimethyl-2,3-epoxy-7-octene (SCM Corp.) and 1,4-dimethyl-4-vinylcyclohexeneoxide (Viking Chemical Co.). Limonenoxide is preferred.

The precious metal catalyst for the hydrosilation reactions involved in the present invention may be selected from the group of platinum-metal complexes which includes complexes of ruthenium, rhodium, palladium, osmium, iridium and platinum.

Preferably the vinyl-functional siloxane crosslinking fluid will be selected from the group consisting of dimethylvinyl chainstopped linear polydimethylsiloxane, dimethylvinyl chainstopped polydimethyl-methylvinyl siloxane copolymer, tetravinyltetramethylcyclotetrasiloxane, and tetramethyldivinyldisiloxane. The hydrogen-functional siloxane precursor fluid can be selected from the group consisting of sym-tetrahydrotetramethylcyclotetrasiloxane, dimethylhydrogen-chainstopped linear polydimethylsiloxane, dimethylhydrogen-chainstopped polydimethyl-methylhydrogen siloxane copolymer and sym-tetramethyldihydrodisiloxane.

The epoxyfunctional siloxane fluids can be made UV-curable by combination with a catalytic amount of a photocatalyst (photoinitiator), suitable examples of which are known to persons skilled in the art. Preferred photoinitiators for the present epoxyfunctional silicone compositions are the onium salts having the formulae:

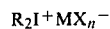

$R_2I^+MX_n^-$

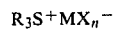

$R_3S^+MX_n^-$

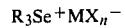

$R_3Se^+MX_n^-$

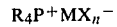

$R_4P^+MX_n^-$

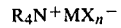

$R_4N^+MX_n^-$ where radicals represented by R can be the same or different organic radicals of from 1 to 30 carbon atoms, including aromatic carbocyclic radicals of from 6 to 20 carbon atoms which can be substituted with from 1 to 4 monovalent radicals selected from $C_{(1-8)}$ alkoxy, $C_{(1-8)}$ alkyl, nitrogen, chloro, bromo, cyano, carboxy, mercapto, etc. and also including aromatic heterocyclic radicals including, e.g. pyridyl, thiophenyl, pyranyl, etc.; and $MX_n^-$ is a non-basic, non-nucleophilic anion, such as $BF_4^-$, $PF_6^-$, $AsF_6^-$, $SbF_6^-$, $SbCl_6^-$, $HSO_4^-$, $ClO_4^-$, and the like.

Diaryl iodonium salts, such as bis(dodecylphenyl)iodonium hexafluoroarsenate and bis(dodecylphenyl)iodonium hexafluoroantimonate, are most preferred.

The amount of catalyst employed is not critical, so long as proper polymerization is effected. As with any catalyst, it is preferable to use the smallest effective amount possible; however, for purposes of illustration, catalyst levels of from about 1%–5% by weight have been found suitable.

In the practice of the invention, the polyfunctional epoxy monomer (or a mixture of monomers) and the photocatalyst must be capable of dissolving or dispersing well in the epoxyfunctional silicone release composition. A UV-curable release coating composition is formed by simply mixing suitable amounts of a CRA and catalytic amounts of a catalyst with the epoxyfunctional silicone component.

The amount of CRA added to the silicone composition will vary according to the desired release. A special advantage of the present invention is that the release of the silicone composition can be tailored to the particular needs of the user with relatively small additions of polyfunctional epoxy monomer. In other words, the CRAs of the present invention are very efficient in altering the release of premium release silicone compositions. Simple experimentation with levels of the present CRAs is contemplated in order to achieve the desired release for a given application.

As disclosed in the aforementioned copending U.S. application Ser. No. 375,676 (incorporated herein by reference), the cure performance and adhesion of the preferred epoxyfunctional compositions described therein to certain porous (i.e., cellulosic) substrates may be enhanced by the addition of epoxy monomers to the compositions. For example, addition of up to ten parts of an aliphatic epoxy monomer for every ten parts of an epoxy-functional silicone fluid results in compositions exhibiting improved UV cure and anchorage on porous cellulosic paper. That discovery is compatible with the present invention: Addition of monofunctional epoxy monomers to promote adhesion and enhance cure along with addition, according to this invention, of polyfunctional epoxy monomers to control release will produce excellent results. Moreover, it has been observed that monofunctional epoxy monomers can be used to affect the release of epoxy-functional silicone release compositions, but only at high levels of about 30 weight percent and above. By contrast, much smaller amounts of the CRAs of the present invention are required to effectively raise the release of the cured coatings, and they will not promote adhesion of the coating to porous cellulosic substrates (in the absence of monofunctional epoxy monomers).

The UV-curable epoxyfunctional silicone compositions of the present invention can be applied to cellulosic and other substrates including paper, metal, foil, glass, polyethylene coated kraft paper, supercalendered kraft paper, polyethylene films, polypropylene films and polyester films. A photoinitiated reaction will cure the epoxyfunctional silicone compositions to form an abhesive surface on the coated substrate. Inerting of the cure environment, such as with nitrogen, may be desirable where the presence of oxygen inhibits the cure reaction; however, inerting is not necessary when the preferred onium salt photoinitiators are employed.

In order that persons skilled in the art may better understand the practice of the present invention, the following examples are provided by way of illustration, and not by way of limitation.

EXAMPLES A AND B 200 parts by weight of a 70 cps. dimethylhydrogen-chainstopped linear polydimethyl-methylhydrogen siloxane copolymer fluid were dissolved in 167 parts by weight toluene. 55 parts by weight limoneneoxide and 5 parts by weight of a 3,000 cps. dimethylvinyl-chainstopped linear polydimethyl siloxane fluid were then added. 0.4 parts by weight of a platinum hydrosilation catalyst and 0.25 parts by weight dimethylhydroxyacetophenone (Darocure® 1173 photoinitiator; E. M. Chemicals) were added to the reaction mixture, which was then refluxed for 16 hours. Unreacted ≡SiH groups were removed by reaction with n-hexene. Excess hexene and toluene were stripped under a vacuum at 130° C. to yield 228 parts by weight of an 800 cps. fluid.

The reaction product was blended with 57 parts by weight of epoxy monomer, 1,2-epoxy dodecane (Vikolox® 12; Viking Chemical) and designated Sample A. Coating baths were then prepared as follows: (All amounts are parts by weight)

|  | epoxysilicone fluid (Sample A) | hexane | polyfunctional epoxide | photocatalyst ($C_{12}H_{25}Ph)_2IsbF_6$) |
|---|---|---|---|---|
| BATH A | 20 pbw | 80 pbw | — | 0.3 pbw |
| BATH B | 19 pbw | 80 pbw | 1 pbw limonenedioxide | 0.3 pbw |

8"×10" sheets of 40-lbs. supercalandered kraft (SCK) paper were coated with the coating baths A and B using a #2 wire-wound rod, to give coating deposits of about 0.5 to 0.6 pounds/ream. The coated sheets were exposed to ultraviolet radiation from two Hanovia medium-pressure mercury lamps operating at a focused power of 300 watts/inch in a PPG 102 QC ultraviolet processor. An exposure of 0.15 seconds under an inert atmosphere gave smear-free and migration-free abhesive coatings.

Laminates were prepared on the epoxysilicone-coated sheets by applying a 5 mil layer of an agressive SBR rubber adhesives (No. 4950; Coated Products, Inc.) and then pressing a second sheet of uncoated SCK paper onto the adhesive layer. Release performance was tested by pulling the SCK-SBR lamina from the SCK-epoxy-silicone lamina at a 180° angle at 400 ft./min. using a Scott tester. The force required to separate two-inch wide strips of the laminates was recorded, with the following results:

|  | Release (grams) |
|---|---|
| BATH A | 120–140 |
| BATH B | 180–220 |

From these results it is seen that an addition of 5 weight percent limonenedioxide to the premium release epoxyfunctional silicone composition results in about a 55% increase in release against the SBR adhesive.

EXAMPLES C–F

A 250 cps. epoxyfunctional silicone fluid containing 20 weight percent epoxy monomer (1,2-epoxy dodecane) was prepared in the same manner as described above (Sample A) except that 10 parts by weight of the 300,000 cps. dimethylvinyl-chainstopped linear polydimethyl siloxane fluid (rather than 5 parts by weight) were employed. This epoxysilicone fluid was designated Sample C. Four coating baths were prepared as follows, using the Sample C fluid and vinylcyclohexenedioxide (VCDO) as the controlled release additive: (All amounts are in parts by weight)

|  | epoxy-silicone fluid (Sample C) | hexane | poly-functional epoxide | photocatalyst $(C_{12}H_{25}Ph)_2ISbF_6$ |
|---|---|---|---|---|
| BATH C | 20 pbw | 80 pbw | — | 0.3 pbw |
| BATH D | 19 pbw | 80 pbw | 1.0 pbw VCDO | 0.3 pbw |
| BATH E | 18 pbw | 80 pbw | 2.0 pbw VCDO | 0.3 pbw |
| BATH F | 16 pbw | 80 pbw | 4.0 VCDO | 0.3 pbw |

The four coating baths were coated on SCK paper and UV-cured as in Examples A and B. Laminates were prepared with a 10 mil layer of an aggressive acrylic pressure-sensitive adhesive (Gelva ® 263; Monsanto). Release performance was determined as above, with the following results:

|  | Release (grams) |
|---|---|
| BATH C | 130–150 |
| BATH D | 200–220 |
| BATH E | 260–290 |
| BATH F | 400–450 |

The quantitative increase in release with 5 weight percent VCDO is approximately the same as observed using limonenedioxide, with larger increases noted as VCDO concentration is raised.

Obviously, modifications and variations in the present invention are possible in light of the foregoing disclosure. It is understood, however, that any incidental changes made in the particular embodiments of the invention as disclosed are within the full intended scope of the invention as defined by the appended claims.

What is claimed is:

1. An ultraviolet radiation-curable controlled release composition comprising:
   (A) an epoxyfunctional diorganopolysiloxane comprising units of the formula RR'SiO, wherein R is hydrogen or $C_{(1-8)}$ alkyl and R' is R or a monovalent epoxyfunctional organic radical of from 2 to 20 carbon atoms, said diorganopolysiloxane having up to about 20% by weight epoxyfunctional groups and a viscosity of from about 50 centipoise to 200,000 centipoise at 25° C.;
   (B) a catalytic amount of a photocatalyst or a combination of photocatalysts; and
   (C) a small amount of epoxy monomer having two or more epoxy groups or a combination of epoxy monomers having two or more epoxy groups effective to raise the release of the cured controlled release composition.

2. A controlled release composition as defined in claim 1, wherein the photocatalyst component (B) is an onium salt having the formula:

$R_2I^+MX_n^-$, $R_3S^+MX_n^-$, $R_3Se^+MX_n^-$, $R_4P^+MX_n^-$, or $R_4N^+MX_n^-$ wherein radicals represented by R can be the same or different organic radicals of from 1 to 30 carbon atoms selected from the group comprising aromatic carbocyclic radicals of from 6 to 20 carbon atoms; aromatic carbocyclic radicals of from 6 to 20 carbon atoms substituted with from 1 to 4 monovalent organic radicals selected from $C_{(1-8)}$ alkoxy, $C_{(1-8)}$ alkyl, nitrogen, chloro, bromo, cyano, carboxy, mercapto; aromatic heterocyclic radicals selected from the group comprising pyridyl, thiophenyl, pyranyl; and wherein $MX_n^-$ is a non-basic, non-nucleophilic anion selected from the group comprising $BF_4^-$, $PF_6^-$, $AsF_6^-$, $SbF_6^-$, $SbCl_6^-$, $HSO_4^-$, and $ClO_4^-$.

3. A controlled release composition as defined in claim 2, wherein the onium salt is a diaryl iodonium salt.

4. A controlled release composition as defined in claim 3, wherein said iodonium salt is selected from the group consisting of bis(dodecylphenyl)iodonium hexafluoroantimonate and bis(dodecylphenyl)iodonium hexafluoroarsenate.

5. A controlled release composition as defined in claim 3, further comprising as component (D), a small amount of monofunctional epoxy monomers sufficient to enhance the cure performance and promote anchorage of said controlled release compostitions.

6. A controlled release composition as defined in claim 3, wherein component (C) is selected from the group consisting of limonenedioxide, vinylcyclohexenedioxide, bis(2,3-epoxycyclopentyl ether, 3,4-epoxycyclohexylmethyl-3,4-epoxycyclohexanecarboxylate and butanedioldiglycidyl ether.

7. A controlled release coating composition as defined in claim 3, wherein component (C) is selected from limonenedioxide and vinylcyclohexenedioxide.

8. A controlled release composition as defined in claim 5, wherein component (C) is selected from limonenedioxide and vinylcyclohexenedioxide.

9. A controlled release composition as defined in claim 8, wherein the monofunctional epoxy monomer component (D) is a ω-epoxy $C_{(8-11)}$ aliphatic hydrocarbon.

10. A solid substrate coated on at lease one surface with a controlled release composition comprising:
    (A) an epoxyfunctional diorganopolysiloxane comprising units of the formula RR'SiO, wherein R is hydrogen or $C_{(1-8)}$ alkyl and R' is R or a monovalent epoxyfunctional organic radical of from 2 to 20 carbon atoms, said diorganopolysiloxane having up to about 20% by weight epoxyfunctional groups and a viscosity of from about 50 centipoise to 200,000 centipoise at 25° C.;
    (B) a catalytic amount of a photocatalyst or a combination of photocatalysts; and
    (C) a small amount of epoxy monomer having two or more epoxy groups or a combination of epoxy monomers having two or more epoxy groups effective to raise the release of the cured controlled release composition.

11. A coated substrate as defined in claim 10, wherein said substrate is selected from the group consisting of paper, metal, foil, glass, polyethylene coated kraft paper, super calandered kraft paper, polyethylene films, polypropylene films and polyester films.

12. A coated substrate as defined in claim 10, wherein said controlled release composition has been cured on said substrate.

13. A process for preparing an ultraviolet radiation-curable epoxyfunctional silicone controlled release coating composition comprising:
   (1) reacting a vinyl-functional epoxide with a hydrogen-functional polysiloxane fluid in the presence of a catalytic amount of a hydrosilation catalyst;
   (2) recovering an epoxyfunctional polysiloxane reaction product;
   (3) adding a catalytic amount of photocatalyst; and
   (4) adding a small amount of epoxy monomer having two or more epoxy groups or a combination of epoxy monomers having two or more epoxy groups effective to raise the release of the cured controlled release composition.

14. The process of claim 13, wherein said vinyl-functional epoxide is selected from the group consisting of limoneneoxide, 2,6-dimethyl-2,3-epoxy-7-octene, vinylcyclohexeneoxide, and 1,4-dimethyl-4-vinylcyclohexeneoxide; said photocatalyst is a diaryl iodonium salt; and said polyfunctional epoxy monomer is selected from vinylcyclohexenedioxide and limonenedioxide.

15. The process of claim 14, further comprising the additional step (5) of adding a small amount of monofunctional epoxy monomer sufficient to enhance cure and anchorage of said controlled release composition.

16. The process of claim 14, wherein the vinyl-functional epoxide is limoneneoxide, the hydrogen-functional polysiloxane fluid is a polydimethyl-methylhydrogen siloxane copolymer, the photocatalyst is a bis(dodecylphenyl)iodonium hexafluoroantimonate, and the polyfunctional epoxy monomer is limonenedioxide.

17. The process of claim 15, wherein the vinyl-functional epoxide is limoneneoxide, the hydrogen-functional polysiloxane fluid is a polydimethyl-methylhydrogen siloxane copolymer, the photocatalyst is a bis(dodecylphenyl)iodonium hexafluoroantimonate, the polyfunctional epoxy monomer is limonenedioxide, and the monofunctional epoxy monomer is a $\omega$-epoxy $C_{(8-11)}$ aliphatic hydrocarbon.

* * * * *